Feb. 14, 1956 D. C. GERBER 2,734,214
LIGHT ARRANGEMENT FOR SUCTION CLEANERS
Filed Jan. 29, 1953 2 Sheets-Sheet 1

INVENTOR.
Dale C. Gerber
BY
ATTORNEY.

Feb. 14, 1956 D. C. GERBER 2,734,214
LIGHT ARRANGEMENT FOR SUCTION CLEANERS
Filed Jan. 29, 1953 2 Sheets-Sheet 2

INVENTOR.
Dale C. Gerber
BY Elmer R. Johnson
ATTORNEY.

United States Patent Office 2,734,214
Patented Feb. 14, 1956

2,734,214

LIGHT ARRANGEMENT FOR SUCTION CLEANERS

Dale C. Gerber, North Canton, Ohio, assignor to The Hoover Company, North Canton, Ohio, a corporation of Ohio Application January 29, 1953, Serial No. 333,999

5 Claims. (Cl. 15—324)

The present invention relates to suction cleaners of the tank type and more particularly to mounting a light which is rotated by the suction cleaner hose to illuminate the surface being cleaned.

Figure 1:
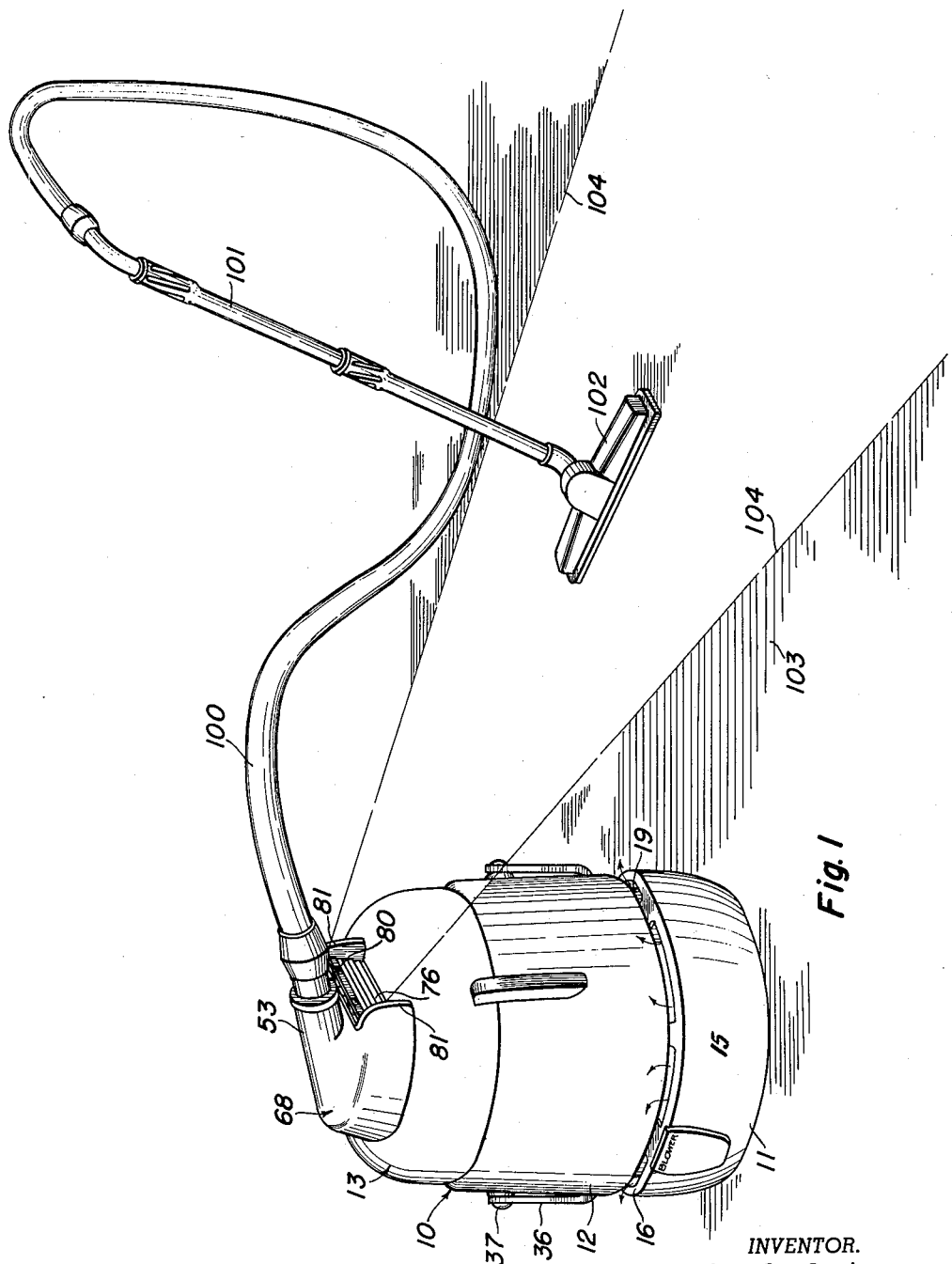
Figure 2:
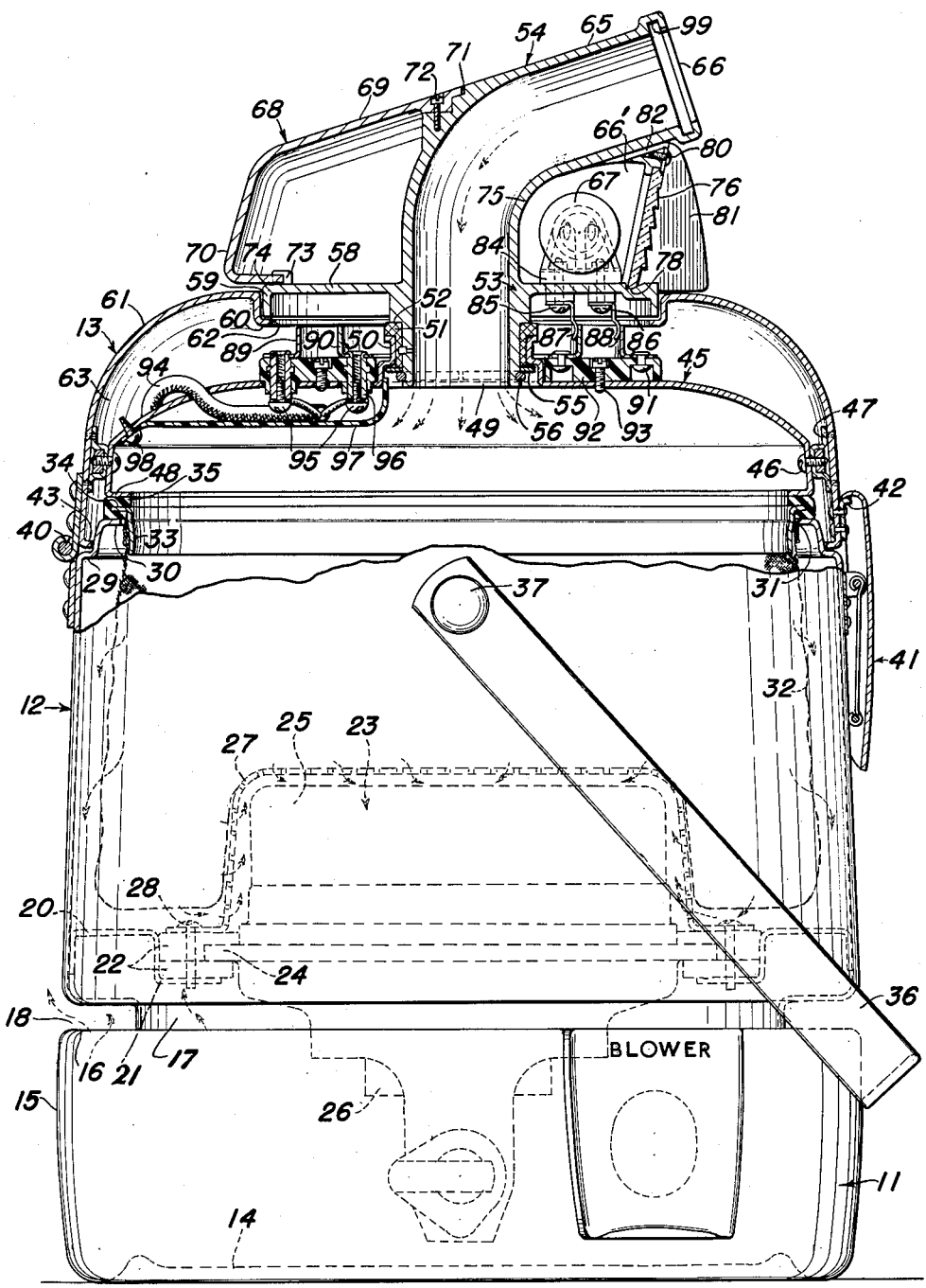

An object of the invention is to provide a suction cleaner having a rotatably mounted light which is moved with the suction air inlet by the suction cleaner hose. Another object is to rotatably mount the light and hose coupling as a unit on a cleaner. A further object is to provide a combined hose coupling and light rotatably mounted on the cleaner end cap, the latter also supporting the electrical connections. Other objects and advantages of the invention will become apparent from the following description and drawings wherein:

Figure 1 shows a suction cleaner having a combined light and coupling with an attached hose and surface cleaning tool, and Figure 2 is a side view showing in section the rotatable mounting of the combined hose coupling and light.

The embodiment of the invention herein disclosed comprises a casing 10 having a base 11, an annular housing 12 and an end cap 13. The base 11 is provided with a bottom wall 14 and an annular side wall 15 terminating in an inwardly extending flange 16 on which is suitably mounted a reduced portion 17 of the housing 12 to space the latter above the flange 16 and form an annular open-mouth recess 18. The flange 16 is provided with a plurality of openings 19 for discharging clean air from the casing into the recess 18.

Rigidly secured to the lower portion of the housing 12 is an annular metal bracket 20 having a depending shoulder 21 in which is seated a pair of resilient rings 22. A motor-fan unit 23 is supported between the resilient rings 22 by an annular rib 24 and is provided with a multi-stage fan chamber 25 and a motor 26, the latter being disposed substantially within the base 11. A metal screen 27 encloses that portion of the motor-fan unit 23 projecting above the bracket 20 and is secured to the flange 21 by a plurality of bolts 28 passing through the resilient rings 22. At the upper end of the housing 12 is an inwardly projecting annular shoulder 29 and a flange 30, the latter defining an opening 31 for inserting a dirt filtering bag 32 the lower portion of which rests on the metal screen 27. The open end of the bag 32 is attached to a metal ring 33 having a flange 34 seated in a rubber gasket 35 which rests upon the flange 30 to support the bag 32 in the housing 12. A handle 36 is pivotally mounted at 37 on the housing 12 for carrying the cleaner from place to place.

The end cap 13 is pivotally mounted on the housing 12 by a hinge 40, and a latch 41 is movably secured to the housing and engages a lug 42 on the cap 13 to lock the latter to the housing and nest a marginal flange 43 on the end cap in the shoulder 29 of the housing 12. A domed shaped partition 45 is removably secured to the end cap 13 by a plurality of screws 46 threaded into spaced brackets 47 on the end cap, and is provided with a marginal flange 48 which abuts the rubber gasket 35 to form an air tight seal between the end cap 13 and the housing 12, and also secure the bag 32 in the housing. The central portion of the partition 45 is provided with an opening 49 defined by an annular U-shaped collar 50 upon which is seated a bearing 51 rotatably supporting a flanged portion 52 of a suction air conduit 53 removably secured to the partition 45 by a washer 55 and a split ring 56.

An annular platform 58 extends laterally from the conduit 53 and has a depending marginal flange 59 which is rotatable within a depressed shoulder 60 formed in the outer wall 61 of the end cap. The shoulder 60 defines an opening 62 around the conduit 53 below the platform 58 and communicates with a chamber 63 formed between the partition 45 and the outer wall 61 of the end cap.

The upper portion of the conduit 53 has a lateral extension 65 terminating in a suction air inlet opening 66 and is spaced from the platform 58 to form with the latter a space 66' for a light bulb 67 which illuminates the area to be cleaned. The space 66' is enclosed by a member 68 having a top wall 69 and a depending side wall 70, the top wall being provided with an elongated opening 71 to receive the conduit 53 for assembly thereon by means of a bolt 72 and a hook 73 on the platform 58 in which is seated an inturned flange 74 of the side wall 70. A portion of the top wall 69 and side wall 70 extends between the laterally projecting portion 65 of the conduit 53 and the platform 58 to form a housing 75 for the light bulb 67. That portion of the housing disposed beneath the inlet 66 is closed by a lens 76 attached to the housing by having its lower edge seated in a recess 78 in the platform 58 and its upper edge secured to the housing top wall 69 by a pair of screws 80. The light rays from the bulb 67 are directed outwardly from the housing 75 in the same direction as the suction inlet 66 by extensions 81—81 of the side walls 70 projecting forwardly of the lens 76. An opening 82 is formed in the housing 75 above the lens 76 for cooling the bulb 67.

The light bulb 67 is supported in the housing 75 on a bracket 84 mounted on the platform 58 by bolts 85 and 86. The terminals of the bulb 67 are connected to the bolts 85 and 86 which respectively support a leaf spring contact 87 and 88 projecting downwardly through the opening 62 into the chamber 63. Spring contacts 87 and 88 slideably engage stationary collector rings 89 and 90 secured by rivets 91 to an annular ring 92 of insulating material mounted on the partition 45 by screws 93. An electric cord 94 is connected to the collector rings 89 and 90 by screws 95 threaded into hollow rivets 96 supported in the insulating ring 92. A member 97 of insulating material encloses the exposed electrical connections below the partition 45 and is removably attached to the latter by a screw 98. The electric cord 94 is suitably connected to the motor 26 and an unshown switch to energize the bulb when the motor is operated.

At the suction inlet 66 of the conduit 53 is an annular recess 99 for connecting one end of a flexible hose 100 at the other end of which is attached a rigid wand 101 provided with a suction cleaning tool 102 for engaging the surface 103 to be cleaned.

In operation, the cleaner is supported in a vertical position on the floor covering 103, and the motor-fan unit 23 energized to create suction in the cleaning tool 102 which is then manipulated by the wand 101 and hose 100 over the floor covering 103. The dirt removed from the floor covering is carried by the suction air stream through the wand 101, hose 100 to the conduit 53 and discharged into the bag 32 which removes the dirt and clean air passes through the screen 27 into the fan chamber 25 and motor 26 and then is discharged through the openings 19 into the atmosphere.

While the motor is operating, the bulb 67 is energized to project light rays through the lens 76 and the rays are directed by the side wall extensions 81 onto the floor covering 103 in an area between the lines 104—104 as shown in Figure 1. Since the light rays from the bulb 67 are projected in the same direction as the suction cleaner inlet 66 and the cleaner hose connection 99, movement of the hose 100 by the operator causes the light bulb 67 and the suction inlet 66 to rotate as a unit to illuminate the floor covering 103 and the cleaning tool 102. The operator can direct the light rays in any desired direction from a remote position with respect to the bulb 67 by manipulating the hose 100 to cause the bulb 67 to be rotated to a position to illuminate the area being cleaned.

While I have shown but a single embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. In a suction cleaner, a casing, suction-creating means in said casing, means forming a conduit communicating with said suction creating means and having an inlet at the top of said casing for a dirt-laden air stream directed laterally of said casing, means mounting a light bulb beneath said inlet to project light rays forwardly of said inlet, and means mounting said conduit and light bulb on the top of said casing for rotation as a unit about a vertical axis to at all times direct said light rays forwardly of said inlet during rotation of conduit.

2. In a suction cleaner, a casing, suction-creating means in said casing, means forming a conduit communicating with said suction creating means and having an inlet for dirt-laden air directed laterally of said casing and overlying the top of said casing to provide a space therebetween, means mounting a light bulb in said space to project light rays forwardly of said inlet, and means mounting said conduit and light bulb on the top of said casing for rotation as a unit about a vertical axis to at all times direct said light rays forwardly of said inlet during rotation of said conduit.

3. In a suction cleaner, a casing, suction-creating means in said casing, a cap for the top of said casing and pivotally mounted on the latter, a conduit on said cap communicating with said suction creating means and having an inlet for dirt-laden air directed laterally of said casing, means mounting a light bulb to project light rays forwardly of said inlet, electric terminals mounted interiorly of said cap and connected to said light bulb, and means mounting said conduit and light bulb on said cap for rotation as a unit about a vertical axis to at all times direct light rays forwardly of said inlet during rotation of said conduit.

4. In a suction cleaner, a casing, suction-creating means in said casing, a cap for the top of said casing and pivotally mounted on the latter, a conduit on said cap communicating at one end with said suction creating means and having an inlet at its other end for dirt-laden air, directed laterally of said casing, coupling means in said conduit at said inlet for attachment of a cleaner hose provided with a surface cleaning tool, means mounting a light bulb to project light rays forwardly of said inlet in the direction of the attached hose, electric terminals mounted interiorly of said cap and connected to said light bulb, and bearing means in said cap mounting said conduit and light bulb on said cap for rotation as a unit about a vertical axis by manipulation of the attached hose to at all times direct said light rays forwardly of said inlet to illuminate the surface being cleaned.

5. In a suction cleaner, a casing, a dirt filter in said casing, a cap movably mounted on the top of said casing for removable insertion of said filter in said casing, a conduit on said cap communicating at one end with said filter and having an inlet at its other end for dirt-laden air directed laterally of said casing, coupling means in said conduit for attaching to said inlet a cleaner hose provided with a surface cleaning tool, means on said conduit mounting a light bulb below said inlet to project light rays forwardly of said inlet and below said hose, electric terminals mounted interiorly of said cap and connected to said bulb and movable therewith for said removable insertion of said filter in said casing, and means mounting said conduit and light bulb on said cap for rotation as a unit about a vertical axis by manipulation of the attached hose to at all times direct said light rays forwardly of said inlet during rotation of said conduit.

References Cited in the file of this patent

UNITED STATES PATENTS

| | | |
|---|---|---|
| 1,586,465 | Perdue | May 25, 1926 |
| 1,728,487 | Gardner | Sept. 17, 1929 |
| 1,970,674 | Seibert et al. | Aug. 21, 1934 |
| 2,260,325 | Leathers | Oct. 28, 1941 |
| 2,563,717 | Gerber | Aug. 7, 1951 |
| 2,634,451 | Dow | Apr. 14, 1953 |

FOREIGN PATENTS

| | | |
|---|---|---|
| 244,643 | Italy | Feb. 10, 1926 |